United States Patent
Ashby

(10) Patent No.: US 11,037,458 B2
(45) Date of Patent: *Jun. 15, 2021

(54) INTERACTIVE METHOD FOR DIAGNOSING TEST-TAKING ERRORS

(71) Applicant: Cynthia Elnora Ashby, Houston, TX (US)

(72) Inventor: Cynthia Elnora Ashby, Houston, TX (US)

(*) Notice: Subject to any disclaimer, the term of this patent is extended or adjusted under 35 U.S.C. 154(b) by 324 days.

This patent is subject to a terminal disclaimer.

(21) Appl. No.: 16/035,636

(22) Filed: Jul. 15, 2018

(65) Prior Publication Data

US 2019/0139433 A1    May 9, 2019

Related U.S. Application Data

(63) Continuation of application No. 11/870,179, filed on Oct. 10, 2007, now Pat. No. 10,037,707.

(60) Provisional application No. 60/851,279, filed on Oct. 11, 2006.

(51) Int. Cl.
  *G09B 7/00* (2006.01)
  *G09B 7/06* (2006.01)

(52) U.S. Cl.
  CPC .................. *G09B 7/00* (2013.01); *G09B 7/06* (2013.01)

(58) Field of Classification Search
  CPC ... G09B 7/00; G09B 7/06; G09B 7/08; G09B 17/00
  See application file for complete search history.

(56) References Cited

U.S. PATENT DOCUMENTS

| | | | | |
|---|---|---|---|---|
| 6,461,166 B1* | 10/2002 | Berman | ........ | G09B 7/04 434/322 |
| 6,471,521 B1* | 10/2002 | Dornbush | ........ | G09B 5/14 434/322 |
| 6,491,525 B1* | 12/2002 | Hersh | ........ | A61B 5/16 434/236 |
| 6,592,379 B1* | 7/2003 | Stuppy | ........ | G06Q 10/00 434/322 |
| 6,629,846 B2* | 10/2003 | Poreh | ........ | G09B 23/28 434/236 |
| 6,685,482 B2* | 2/2004 | Hopp | ........ | G09B 7/02 434/118 |
| 6,699,043 B2* | 3/2004 | Ho | ........ | G09B 5/06 434/236 |
| 6,960,088 B1* | 11/2005 | Long | ........ | G09B 3/02 434/322 |
| 2002/0160347 A1* | 10/2002 | Wallace | ........ | G09B 7/06 434/322 |
| 2004/0018479 A1* | 1/2004 | Pritchard | ........ | G09B 7/02 434/350 |
| 2004/0063085 A1* | 4/2004 | Ivanir | ........ | G09B 7/08 434/322 |
| 2006/0084048 A1* | 4/2006 | Sanford | ........ | G09B 7/00 434/323 |
| 2006/0099563 A1* | 5/2006 | Liu | ........ | G09B 7/02 434/350 |

* cited by examiner

*Primary Examiner* — Peter R Egloff
(74) *Attorney, Agent, or Firm* — G.Michael Roebuck, PC

(57) ABSTRACT

A computer based interactive system and method of diagnosing test taking errors for educational and psychological processes on a computer while a learner is taking an exam over the internet, when the learner arrives at a wrong answer to an exam question.

3 Claims, 6 Drawing Sheets

EDUCATOR'S ASSESSMENT TOOL

Learners name _____    Subject _____
Address _____    Institution _____
Age _____ Grade _____    Learning Disability? Type? _____

| | 1 | 2 | 3 | 4 | 5 | Other |
|---|---|---|---|---|---|---|
| I. Logistics Assessment | | | | | | |
| A. Choose distracter | | | | | | |
| B. Misreads the question | | | | | | |
| C. Reading more into the question than the question actually asks | | | | | | |
| D. Did not really understand what the question was asking | √ | | | | | |
| E. Loses his/her train of thought | | | | | | |
| F. Tangential thinking | | | | | | |
| G. Preconceived idea that was not actually in the question | √ | √ | √ | | | |
| II. Linguistic Assessment | | | | | | |
| A. Literal translation from first language which changes the meaning of the question | | | | | | |
| B. Sequencing of words: subject, verb, direct object, pronouns, nouns, etc. | | | | | | |
| III. Cognitive assessment | | | | | | |
| A. Lack of knowledge | | | | | | |
| B. Lack of Comprehension<br>  1. Cannot translate<br>  2. Does not know how to interpret<br>  3. Does not know how to extrapolate | <br>√<br><br> | | | | | |
| C. Unable to apply knowledge<br>  1. Does not recognize principles and generalizations<br>  2. Unable to problem solve | | | | | | |
| D. Unable to analyze information<br>  1. Does not break down information into component parts or elements<br>  2. Does not recognize relationships between components or elements<br>  3. Does not perceive organizational principles | | | | | | |
| E. Unable to synthesize<br>  1. Does not know how to develop a plan of operation<br>  2. Unable to recognize or establish a set of abstract relations | | | | | | |
| F. Unable to evaluate: Does not know how to make criteria based decisions. | | | | | | |
| IV. Affective Assessment | | | | | | |
| A. Receiving - not aware<br>B. Responding - unwilling to respond<br>C. Valuing - no commitment<br>D. Organization - does not conceptualize/organize values<br>E. Characterization by a value/value complex - unable to identify or characterize value or value complex | | | | | | |

FIG. 2

INTERACTIVE METHOD FOR DIAGNOSING TEST-TAKING ERRORS

CROSS-REFERENCE TO RELATED APPLICATIONS

This application claims the benefit under 35 U.S.C. § 119(e) of U.S. Provisional Patent Application No. 60/851,279 filed Oct. 11, 2006, the disclosure of which is hereby incorporated herein by reference and claims benefit of U.S. patent application Ser. No. 11/870,179 filed on Oct. 10, 2007 entitled Interactive Method for Diagnosing Test-Taking Errors by Ashby, which is also incorporated by reference herein in its entirety.

BACKGROUND OF THE INVENTION

Field of the Invention

The present invention generally relates to educational diagnostic methods, and more particularly to materials and methods for assessing and diagnosing errors made while taking tests.

Background

Approximately forty-five percent of students enrolled in senior colleges and universities in this country leave those institutions before they reach their junior year. This constitutes an educational crisis. An ever-growing portion of a person's future can be dictated by their ability to perform well on examinations. However, not all students are adept at the particular skill of test taking. While there is an abundance of literature telling students what to do to raise their test taking skills to a higher level, there remains a need for ways to improve student performance on exams.

BRIEF SUMMARY

Methods, systems and materials are disclosed for assessing and diagnosing educational and psychological errors made by a learner while taking examinations. In accordance with certain embodiments of the invention, a method of diagnosing educational and psychological processes whereby a learner arrives at a wrong answer to an exam question is provided. The method comprises: (a) presenting an exam question to a learner on a visual display; (b) having the learner read said question aloud; (c) having the learner explain aloud in his/her own words what said question is asking; (d) noting by a user any logistic, cognitive, affective and linguistic errors made by the learner in said reading of the questions and answers or in said explaining of the question and possible answers, and entering any such errors into a processor; (e) presenting to said learner on said visual display at least one possible answer to said question; (f) having the learner read aloud each said possible answer, and explain his/her rationale for selecting a particular answer to the question; (g) noting by said user any logistic, cognitive, affective and linguistic errors made by the learner in said reading of each said answer or in said explaining of his/her rationale, and entering any such errors into a processor; (h) forming a database containing data representing the learner's errors, wherein said processor is programmed to assess error patterns from said data; and (i) processing said data to obtain a diagnostic report indicating how the learner tends to select incorrect answers to exam questions.

In some embodiments, the method further comprises providing educational prescriptives to said learner based on said diagnostic report. In some embodiments, noting of any logistic errors comprises identifying one or more of the following problems: reading too much into the question, choosing a distracter question, loses train of thought, misreads the question, tangential thinking, preconceived ideas, does not understand the question. In some embodiments, noting of any cognitive errors comprises identifying one or more of the following problems: lack of knowledge, inability to comprehend, inability to apply knowledge, inability to analyze information, inability to synthesize, and inability to evaluate. In some embodiments, noting of any affective errors comprises identifying one or more of the following problems: not aware of or willing to receive value, not willing to respond satisfactorily, does not accept preferred value or commit to same, does not conceptualize and organize values, and unable to identify or characterize a value or value complex. In some embodiments, noting of linguistic errors comprises identifying one or more of the following problems: literal translation and out of sequence words.

In some embodiments, the question was previously answered incorrectly by the learner on a prior examination, and in some embodiments the question and answers were not previously presented to the learner in a prior examination. In various embodiments the user is an educator, the learner, a tutor, a parent, another learner, a trainer, or an employer, to name just a few examples. In certain embodiments, the educator interacts with said learner from a remote location via a computer network or internet connection.

In some embodiments, an above-described method further includes showing the diagnostic report on said visual display or producing a printed diagnostic report. In some embodiments, an above-described method further includes storing the error data in a database.

Also provided in accordance with certain embodiments of the invention is a method of analyzing test-taking error patterns of multiple learners. This method comprises (a) providing a set of diagnostic data comprising logistic, cognitive, affective and linguistic test taking errors of a learner; (b) providing a set of demographic data relating to said learner; (c) storing said diagnostic and demographic data of said learner in a database; (d) storing corresponding sets of diagnostic and demographic data obtained from a plurality of other learners in said database; (e) accessing said database with a processor; and (f) processing said database to obtain a test-taking error pattern report. In some embodiments, the method includes conducting a statistical analysis of the data obtained from a number of learners. Any suitable statistical analysis method may be used. For example, a frequency distribution of test-taking error patterns may be obtained which identifies students with similar test-taking error pattern diagnoses. In some embodiments, the report comprises a frequency distribution of test-taking error patterns. In some embodiments, the report comprises a frequency distribution of test-taking error patterns in a selected subject matter area. In some embodiments, the report comprises frequency distribution of test-taking error patterns by learners having a selected demographic characteristic. In some embodiments, the report comprises a frequency distribution of test-taking error patterns by learners having a selected educational level.

In accordance with still another embodiment of the invention, a computer-readable medium (CRM) is provided which comprises software that, when executed by a processor, causes the processor to (a) show on a visual display an exam question; (b) show on said visual display at least one correct or incorrect answer to said exam question; (c) show on said visual display a series of exam questions; (d) show on said visual display a series of possible answers to said exam questions; (e) receive from an input device data entered by a user corresponding to errors made by a learner while reading said exam questions aloud; (f) receive from an input device data entered by a user corresponding to errors made by a learner while reading said answers aloud; (g) receive from a keypad data entered by a user corresponding to errors made by a learner while explaining aloud his/her rationale which lead him/her to select an incorrect answer; (h) store all said data in memory; and (i) process said date to obtain a test-taking error pattern with respect to said learner. In some embodiments, the software, when executed by a processor, further causes the processor to: (j) receive an audio input from a user; (k) convert said audio input to digital audio data; (l) store said digital audio data in memory.

In accordance with still another embodiment of the invention, a system for conducting an interactive method for diagnosing test-taking errors is provided which comprises a visual display configured to display exam questions and answers to a learner; an input device configured for entering into the processor data representing the errors noted by a user in accordance with an above-described method; and a processor operatively coupled to said input device and display, wherein said processor comprises memory and is configured for storing and processing data representing said errors, to obtain a test-taking error pattern diagnosis for the learner. In some embodiments, the system further comprises a printer operatively coupled to said processor. In some embodiments, the system further comprises an audio input device operatively coupled to said processor for entering and storing the learner's spoken words in the processor.

Thus, embodiments described herein comprise a combination of features and advantages intended to address various shortcomings associated with certain prior devices. The various characteristics described above, as well as other features, will be readily apparent to those skilled in the art upon reading the following detailed description of the preferred embodiments, and by referring to the accompanying drawings.

BRIEF DESCRIPTION OF THE DRAWINGS

FIG. 2 is an illustration of a worksheet, or educator's assessment tool, for noting test-taking errors and assessing patterns, in accordance with certain embodiments of the invention.

DETAILED DESCRIPTION

Figure 1:
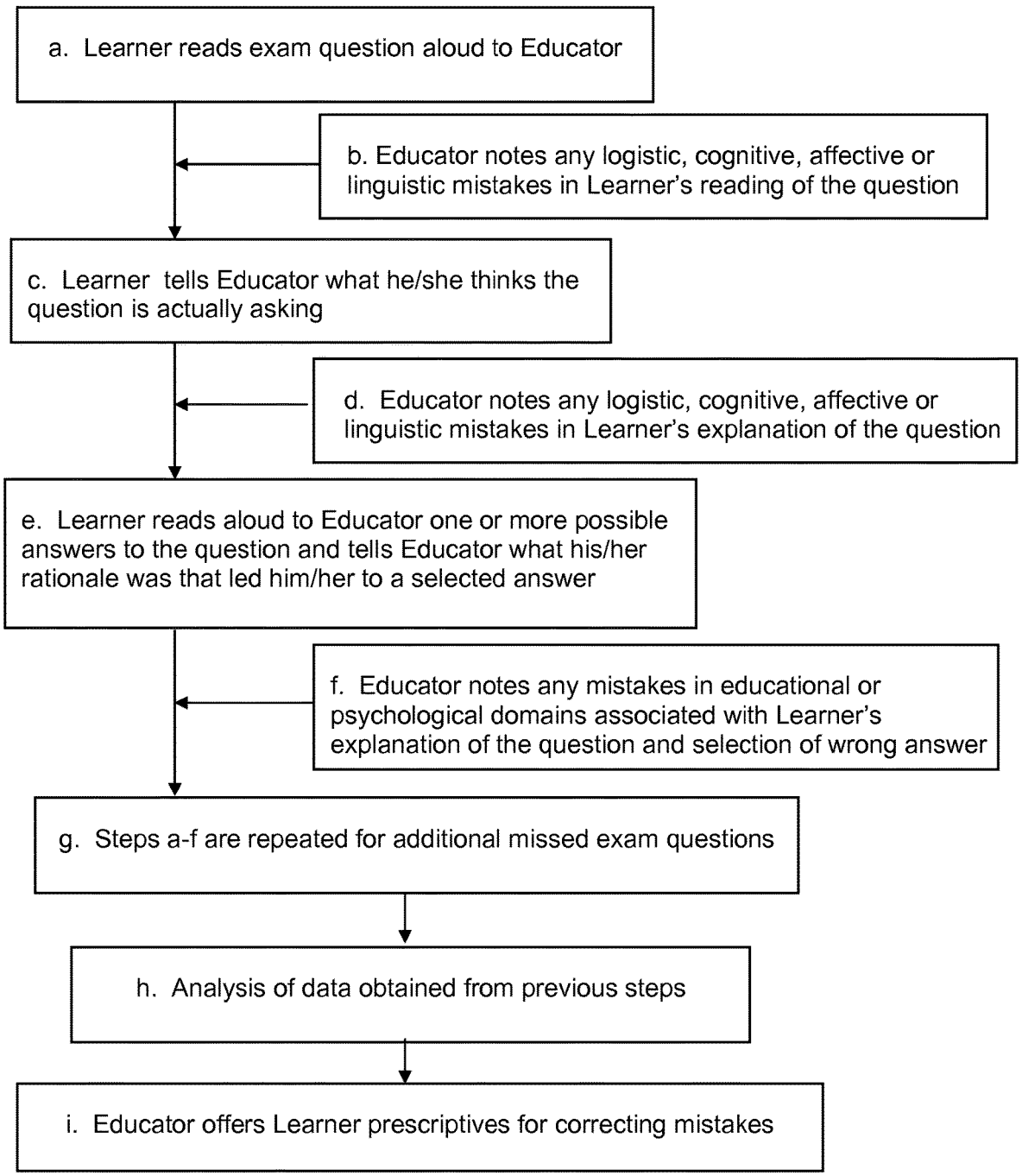
FIG. 1 is a schematic box flow diagram illustrating the steps of a diagnostic method in accordance with certain embodiments of the invention.

Toward diagnosing educational and psychological processes whereby learners arrive at wrong answers on exam questions, methods and materials for identifying a learner's errors while taking exams are disclosed. By assessing the types of errors, and their frequency of occurrence, and analyzing the resulting data, an educator may obtain a diagnosis of the learner's educational and psychological processes whereby the learner tends to make errors made while taking exams. Preferably the diagnostic method is interactive between the learner and the educator. The term "learner" refers to any student or other person who is subject to reading and/or answering examination questions. For consistency, the person administrating the diagnostic method is referred to herein as an "educator," and may be, for example, a teacher, psychologist, tutor, parent, trainer, employer, graduate student, peer group member, or any other individual who is capable of carrying out the method.

Various embodiments of the diagnostic method and materials are applicable to any type of educational examination. This includes, but is not limited to, teacher-prepared exams, standardized exams, computer-generated exams and any other known type of educational test or exam. In some embodiments, a learner may have the question read to him/her and in which only the answer is stated and explained aloud by the student. In some embodiments of the diagnostic method, the learner is actually taking the exam while the diagnostic method is being conducted. In other embodiments, the learner is reviewing with the educator an exam question that the learner missed on a previous test, and which is preferably still fresh in the memory of the learner.

Embodiments of this method lend themselves, variously, to all types of exam questions, such as multiple choice, true/false, essay, completion, fill in the blank, matching, and any other known kind of test question. Likewise, various embodiments of the method are applied to any subject matter which can be taught. For example, mathematics, algebra, calculus, physics, biology, history, medicine, law, accounting, literature, and others. Some embodiments of the diagnostic method are used with learners who are being educated in a second language. English as a Second Language (ESL) is described in examples which follow, since the English language is now considered by many to be the universal language of business.

The diagnostic methods are not specific to content or grade level. Instead, the methods are process oriented, seeking to diagnose how a student arrives at a wrong answer and not "what" the wrong answer is, content wise. Various embodiments are suitable for use in elementary schools, high schools, universities, professional education such as law, medicine, military, business training, and many other settings in which there is an effort to teach, or an exam is given to learners, or in which learners are independently trying to learn. One particular application for the methods, materials and systems described herein in for training military personnel, especially those individuals who have dropped out of high school and joined the military. Many aspects of military training lend themselves to the use of these methods.

Referring to FIG. 1, a box flow diagram is shown which illustrates the steps of an exemplary diagnostic method. (a) The learner begins by reading aloud the questions he/she missed on an previous exam, preferably one that was taken recently and is still fresh in the mind of the learner. Preferably the exam questions and the possible answers that are used in the diagnostic method were not written or previously administered to the learner by the same educator who is conducting the diagnostic method, although this is not an absolute requirement of the method. It is also preferred that the educator who taught the course (in which the exam was given) is not the educator who administers the diagnostic method with the learner, in order to avoid having the diagnostic session revert to a typical educator/learner discussion of what content is on the test rather than focusing on an analysis of the process of how the learner arrived at a wrong answer.

(b) While the learner reads the question, the educator closely observes the learner's reading of the question and assesses for errors. Based on the information gathered by the educator, the educator then makes a corresponding notation. In some instances, a datasheet similar to the report shown in FIG. 2 is used for recording a learner's data, in which case each repetition of a particular type of error is recorded with an indicator, such as a check mark, on the datasheet. When the diagnostic procedure is implemented with a computer (processor), the learner's data is entered into the processor's memory.

(c) The learner then tells the educator in his/her own words what the learner thinks that the question is asking. In so doing, the possibility for error is almost infinite, but some of the following are commonly found: misreading the question; misunderstanding the question; reading more into the question than was actually stated; did not really understand what the question was actually asking; loses his/her train of thought; tangential thinking; and preconceived idea which was not actually contained in the question.

(d) The educator notes any mistakes or errors m the learners explanation of the question, and records the errors as described above.

(e) Once the learner's mistakes on reading the question are identified and recorded by the educator, the student then reads all possible answers available. In the case of a multiple choice question, there will be one or more correct answers and one or more incorrect answers which will be read by the learner. In the case of an essay question in which there was a previously missed answer, the learner reads his/her previous answer. In the case of a true/false question, the learner discusses aloud his/her rationale for selecting either true or false. In the case of a fill in the blank style question, the learner discusses aloud all possible answers that seem reasonable to the learner. In each instance, the learner gives the rationale for the choice.

(f) The educator again notes any mistakes or errors in the learner's reading or discussion of the possible answers, then asks the learner to recall or "re-enact," what he/she was thinking when he/she arrived at the wrong answer. The educator then notes all observations of errors, as before. Once again, the possible ways of arriving at a wrong answer are almost limitless, including all those already mentioned above with respect to the reading of the question.

(g) Additional data for the learner is collected by repeating steps (a) through (f) using additional exam questions and answers. Fifteen to twenty missed questions are generally enough to give the learner and educator an accurate picture of the learner's test-taking error patterns.

(h) The data collected after going through all of the desired exam questions is then reviewed and the types of repeated mistakes or errors, or other patterns revealed by the data, are determined. By assessing the learner's error data, a diagnostic summary report is prepared showing the learner's test-taking pattern(s). In some embodiments the report is similar in content and/or appearance to the Educators Assessment Tool illustrated in FIG. 2.

(i) From the learner's collected data, and the diagnostic report, the educator can then recommend appropriate prescriptives for correcting the learner's errors and potentially improving future test-taking performance.

Representative examples of some common mistakes are addressed below and also illustrated in the assessment sheet shown in FIG. 2. They are broadly classified as logistic, linguistic, cognitive, and affective domains, however learner errors are not limited to only those domains.

EXAMPLES

Diagnosis of Logistic Errors

In some instances, the learner is unable to differentiate between the right answer and the near right answer (called a distracter which is usually partially true and designed to distract the learner from the completely correct answer). The logistical mistakes made in reading the question and possible answers may include misreading the answer; misunderstanding the answer; reading more into the answer than was actually stated; did not really understand what the answer was actually saying; loses his/her train of thought; tangential thinking; and preconceived idea which was not actually contained in the answer.

Diagnosis of Cognitive Errors

A lack of knowledge of the subject matter is indicated when, for example, the learner does not know definitions, simple facts, abstractions, and so forth. An inability to comprehend is indicated if the learner demonstrates that he/she does not know how to translate, interpretate or extrapolate. The learner is assessed as being unable to apply knowledge if, for example, he/she does not know how to use knowledge in solving problems, using in techniques, as so on. An inability to analyze is demonstrated if the learner cannot break down elements, relationships, and organizational principles into parts. An inability to synthesize is reflected when the learner demonstrates that he/she is unable to put information together in a new way, or produce unique communications, plan or set of operations or abstract relations. If the learner is unable to evaluate, this may be indicated in the diagnostic method by observing that the learner does not come to decisions based on objective and subjective criteria. An example demonstrating a lack of knowledge error is as follows:

Question: How does the digestive system supply food molecules to all cells?

Answers: (a) directly by diffusion; (b) diffusion through carbon dioxide; (c) by the circulatory system; (d) a and b; (e) a and c; (f) band c.

This test question requires knowledge only, so if a learner chose any answer other than (e), he/she simply did not know the material.

An example of a question demonstrating inability to apply knowledge is as follows:

Question: The patient is to receive a heat application to his lower back for 20 minutes each morning. Which patient needs to be observed carefully to prevent burns to the skin, even when the temperature of the heat application is in a safe range?

Answers: (a) a football player; (b) an elderly man; (c) a woman who has just had a c-section; (d) a patient recovering from a stroke.

In order to answer this question correctly the learner must be able to comprehend and apply specific facts about the patient's condition, and then apply it in this situation. In this instance, "(b)" is the correct answer.

An example of a question demonstrating inability to analyze is as follows:

Question: A patient is to receive an intravenous administration of an antibiotic. What does the nurse need to know in order to administer this medication according to protocol?

Answers: (a) whether the patient has any allergies, the patient's diagnosis, medical history and whether he has a surgical procedure planned for the following day; (b) previous surgeries the patient may have had, any allergies, had a culture and sensitivity test done; (c) whether the patient has had a culture and sensitivity test performed, has any allergies and has been properly prepared for treatment; (d) whether the patient is taking any beta blockers, has any allergies, or what the patient's primary diagnosis is. The learner is required to know specific facts about the medication and the patient's condition, and then analyze that information and apply it in this situation. In this instance, "(c)" is the correct answer.

An example of a question demonstrating inability to synthesize is as follows:

Question: Prepare a comprehensive nursing care plan for a patient in an acute care facility who came in through the emergency room following a motor vehicle accident. The patient was admitted at 2:00 a.m. yesterday, 35 year old male, with compound comminuted fracture of the left leg.

To answer this question, the learner would have to know how to comprehend, apply, analyze and then synthesize a large amount of knowledge in order to prepare the comprehensive nursing care plan.

An example of a question demonstrating inability to evaluate is as follows:

Question: The patient described in the foregoing section may or may not develop a kidney or bladder infection since he has an indwelling catheter in his bladder. Which of the following answers accurately describe data which indicates he does not appear to have a bladder infection?

Answer: (a) blood pressure of 124/80, and has redness and puffiness over the bladder area on lower abdomen; (b) temperature of 100.8° F., blood pressure of 130/90 and complaining of burning in area of urethra; (c) urine clear, urinary output normal, temperature 98.6° F.; (c) urinary output 300 cc's less than intake in previous 24 hours. In this instance, answer "(c)" is correct. To make the required judgment call, specific criteria are required.

Diagnosis of Errors in Affective Domain

A learner may demonstrate errors in the affective domain by making errors in (1) receiving, such as awareness, willingness to receive, and selective attention; (2) responding, such as acquiescence in responding, willingness to respond, satisfaction in response; (3) valuing, such as acceptance of valuing, preference for a value, commitment; (4) organization, such as conceptualization of organization of a value system; and (5) characterization by a value or value complex, such as a generalized set or characterization, for example. More specifically, the learner may demonstrate that he/she is not aware of or willing to receive value, or has selective attention; not willing to respond satisfactorily, does not accept preferred value or commit to same; does not conceptualize and organize values; or is unable to identify or characterize a value or value complex.

The following exemplary situation illustrates an affective domain error:

Question: You have planned to lead a group of friends on a trip abroad. When all of your friends, some of whom do not know each other, get together over lunch to work on the itinerary, there is conflict between two people about where to go. One even says that she would withdraw if the other's preferred itinerary is not chosen. What would you do?

The possible/available answers are: (a) cancel the group trip; (b) eliminate both from the group; (c) eliminate the one who is not in agreement with your own preferred schedule of stops; or (d) vote on the itinerary?

If the learner chose an answer other than "(d)," which is the best answer, he/she would have demonstrated less than desirable values, assuming that the course objective was to teach democratic values.

The terms, "cognitive domain" and "affective domain" as used herein are consistent with the terminology of *Taxonomy of Educational Objectives*, edited by Benjamin S. Bloom (Longman, N.Y., 1956) and commonly referred to as "Bloom's Taxonomy" in educational institutions. Bloom develops the meaning of those classifications in detail. Bloom states that "the Taxonomy's authors, and present-day curriculum builders and evaluators all share the understanding that educational objectives are statements of instructional intent that combine a content topic and the behavior a student is expected to perform with that topic." The present disclosure is believed to be the first time that the problem of how students miss test questions, including but not limited to questions which are constructed in accordance with Bloom's Taxonomy for the educational objectives stated therein. This disclosure is also believed to be the first time a method has been presented which is directed to identifying, assessing and diagnosing the problem of how students miss test questions.

Diagnosis of Linguistic Errors

In some situations of use, mistakes made by the learner due to language difficulties will be observed. When learners are being educated in a second language, the opportunity for loss in translation is great. This arises, in part, because literal translations from one language to a second language changes the meaning of a simple statement, and then, when the interrogatory form is produced, the format of the language becomes even more entangled. Examples from two languages are presented below, showing the result of literal translation from English to German, then back again from German to English, and in the second case, from English to French and then back from French to English again.

English: "How does the digestive system supply food molecules to all cells?"

German from English above "Wie macht die verdauungsfordernden systemversorgung essensmolekule mit alien zellen?"

German back to English, translated literally: "How does the molecules to digestive system supply food all cells?"

Notice how the prepositional phrase "to all cells" became "to digestive system." This is a very simply example, but shows how the entire meaning changes with literal translation.

English: "How does the digestive system supply food molecules to all cells?" French from English above: "comment le systeme digestif approvisionnement alimentaire molecules a toutes les cellules?

French back to English, translated literally: "How does the digestive route system supply agroalimentaire molecules to the cells?"

These translations reflect errors in translation which result in the question being so distorted as to change the actual meaning. Often in language translations, the sentence structure changes, including place of subject, verb, prepositions, direct objects, and so forth, which, of course, changes the meaning of a statement and makes it doubly so when it becomes the interrogatory form.

Representative examples of linguistic mistakes or errors are misreading a question in a second language by translating it literally from their first language; and failing to differentiate between various forms of grammar such as verbs, direct objects, sequence of words, and so forth.

As mentioned above, the diagnostic methods described herein are not meant to be content specific as they can be used in practically any subject matter at any grade level. For example, as shown in Table 1, a learner (Student A) may be lacking knowledge in math, but may also be missing questions for lack of judgment in literature.

TABLE 1

Student A - Diagnosis Over Content Areas

| | Math | Literature | Chemistry | History | Biology |
|---|---|---|---|---|---|
| Knowledge | X | | X | | X |
| Comprehension | | | | | |
| Application | | | | | |
| Analysis | | | | | |
| Synthesis | | | | | |
| Evaluation | | X | | X | |
| Logistics | X | | X | | |
| Linguistics | | X | | X | |

Student B, meanwhile, may not have a knowledge deficiency, but instead shows weaknesses in the areas of evaluation and linguistics, as shown in Table 2.

TABLE 2

Student B - Diagnosis Over Content Areas

| | Math | Literature | Chemistry | History | Biology |
|---|---|---|---|---|---|
| Knowledge | | | | | |
| Comprehension | | | | | |
| Application | | | X | | |
| Analysis | | | | | |
| Synthesis | X | | | | |
| Evaluation | X | | X | | X |
| Logistics | X | | | | |
| Linguistics | | X | | X | |

Figure 3:
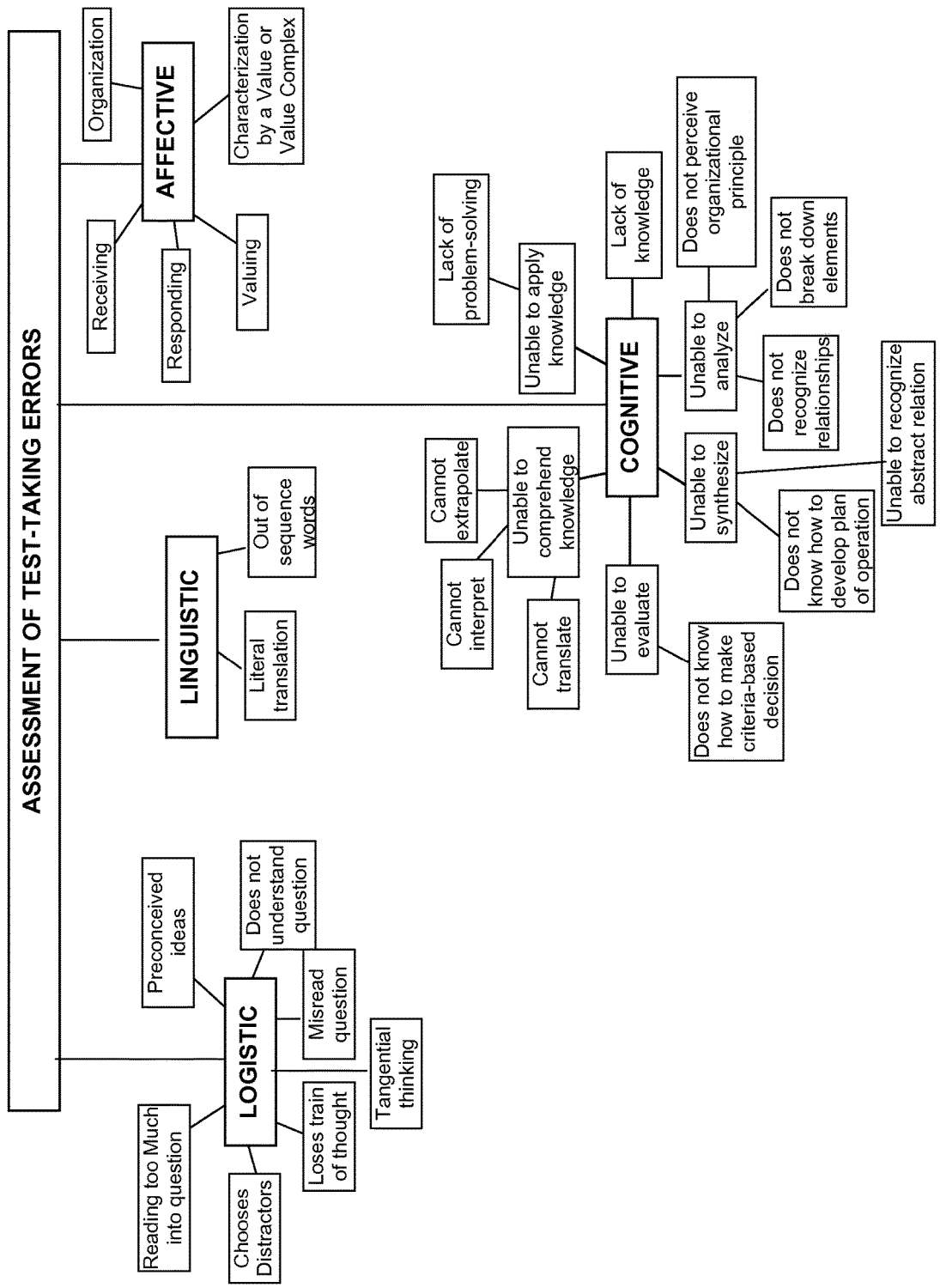
FIG. 3 is a schematic "tree" illustrating educational or psychological domains and various test-taking errors indicative of each domain, as applied in certain embodiments of the invention.

It is one thing to identify questions that have been missed by learners in taking examinations, but it is quite another thing to take examinations review to an interactive level in which the logistic, cognitive, affective, and linguistic processes of the learner are identified, assessed and diagnosed. FIG. 3 is illustrates an assessment tree showing various manifestations of the logistic, cognitive, affective, and linguistic domains. Upon identifying a learner's test-taking errors, and assessing patterns, the resulting diagnosis provides the means whereby the learner can potentially change the way he/she answers test questions, thereby empowering the learner.

Figure 4:
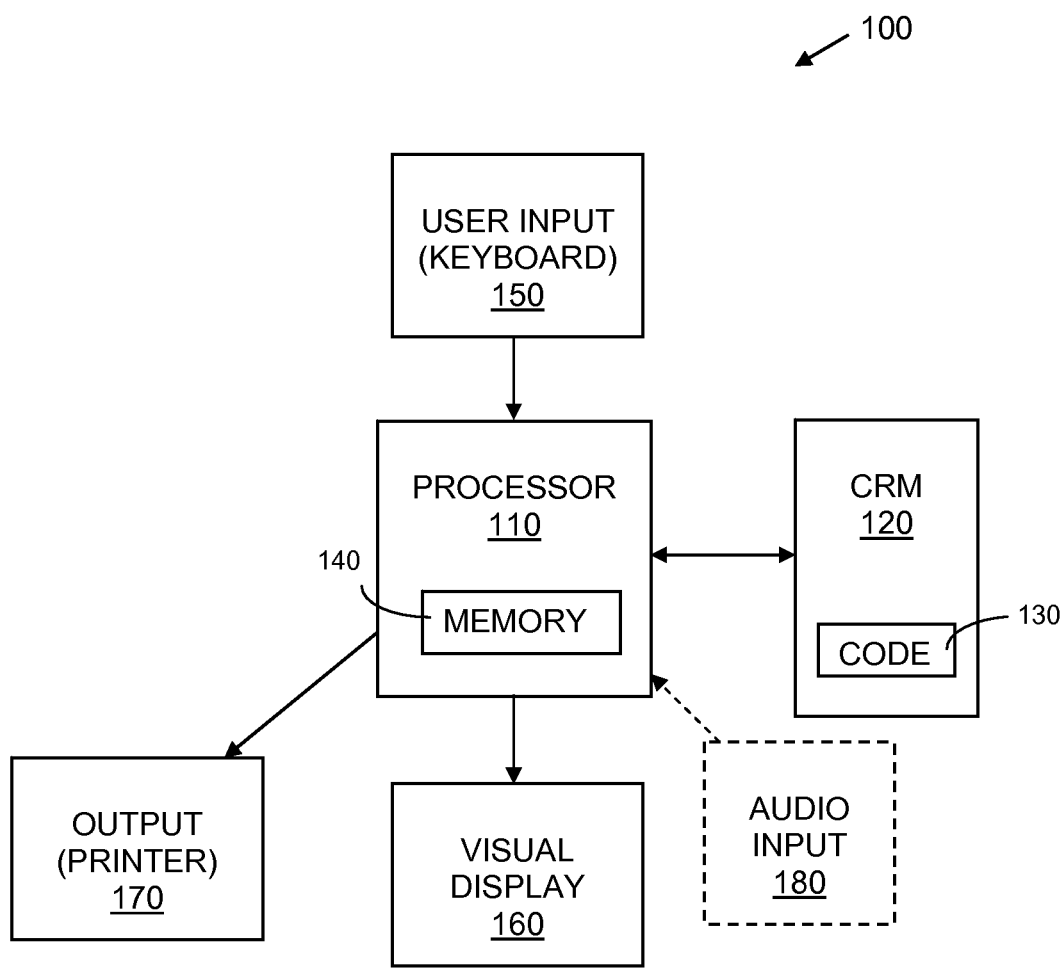
FIG. 4 is a schematic diagram illustration of a workstation configuration for conducting a diagnostic procedure in accordance with certain embodiments of the invention.
Figure 5:
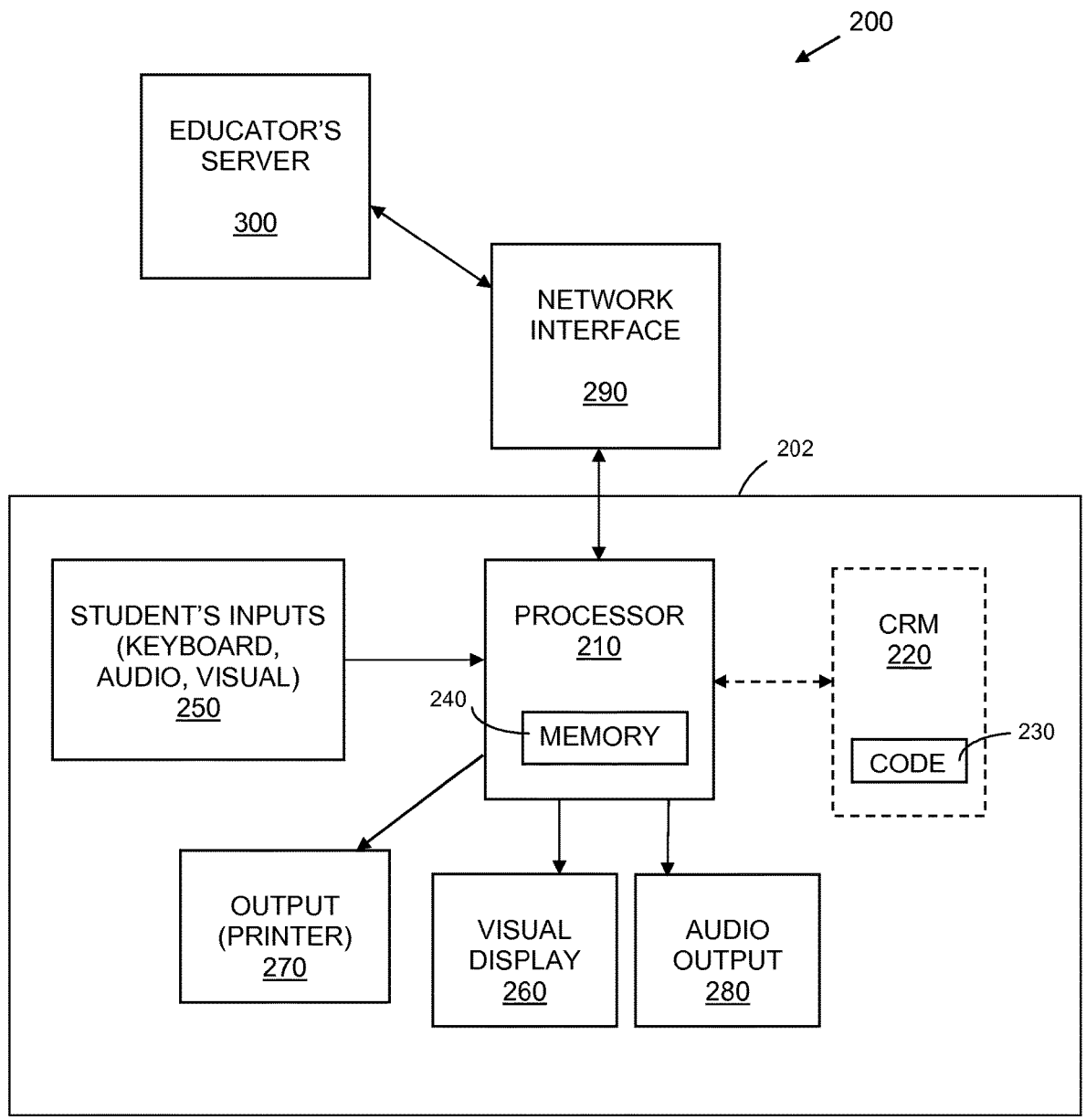
FIG. 5 is a another schematic diagram illustrating the setup of a diagnostic system configured for performing a diagnostic procedure in which the educator and learner are in different locations, in accordance with certain embodiments of the invention.

Referring now to FIG. 4, in some embodiments the diagnostic procedure is conducted in a one-on-one interactive learner-educator arrangement aided by a workstation 100 which includes processor 110 containing memory 140 for storing learner data and for receiving appropriate programming for displaying the exam questions and answers on a visual display 160 and receiving data input on input device 150, such as a keyboard, mouse, or other suitable type of data input device. The processor may also be coupled to an output device 170, such as a printer for producing a printed diagnostic summary report. The processor 110 is also coupled to a computer readable medium (CRM) such as a CD or DVD containing code 130 for causing the processor to display a set of exam questions and corresponding answers on visual display 160, in conjunction with appropriate entries by the user on input device 150. For instance, the user/educator initiates the display of the next exam question, or the next possible answer to a multiple choice question by entering appropriate keystrokes into the processor 110. In some embodiments, the computer assembly 100 also includes an audio input device 180 for receiving the learner's spoken words and transferring it to the processor 110, where it is stored in memory 140 as part of the learner's data profile. The educator may also input into the processor's memory other personal and/or demographic information about the learner, such as name, address, age, educational level, institution name, and so forth, as illustrated in FIG. 2. As discussed above with respect to FIG. 1, the individual learner's stored error data is assessed using at least the criteria shown in assessment tree illustrated in FIG. 3. Although the processor memory 140 is illustrated in FIGS. 4 and 5, as being contained within processor 110, it should be understood that memory may instead or additionally be configured externally to the processor, as a separate unit, in any of the embodiments described herein.

Similar testing and diagnostic data and personal profiles obtained for other learners may, likewise, be stored in the processor memory or uploaded to another processor for statistical analysis. Any method of statistical analysis that is desired may be applied to the data gathered from groups of learners. For example, students with similar test-taking error pattern diagnoses are identified in one type of analysis. In another type of analysis, students in a particular grade or age group having similar test-taking error pattern diagnoses are identified. In still other types of statistical analysis, the frequency distribution of various types of error pattern diagnoses of a group of students is obtained with respect to different subject matter areas (e.g., math, history, biology, English).

The diagnostic methods and materials described herein are expected to find use in a wide variety of institutions and organizations for which diagnostic data may be gathered for the entire organization or institution. For example, school districts, university systems, large businesses that provide employee or customer training, and military training programs. For example, diagnostic data gathered for a large number of learners is entered into the database of a computer, which is programmed to manipulate and analyze the data for any number of useful purposes. The database may include not only the test taking patterns indicating how individual learners are missing questions, but may also include curriculum information and demographic data. Thus, in some applications, a computer containing the diagnostic data and curriculum information could be used to evaluate an entire curriculum with respect to examinations.

Although less preferred, in some applications a learner may wish to perform a computer-aided, self-administered diagnostic procedure that may employ a workstation similar to workstation 100 shown in FIG. 4. In this case, the learner functions as both the learner and the educator. The learner obtains the computer readable medium 120 (e.g., CD or DVD) containing the software for conducting the test. The exam questions and answers are input or uploaded into the processor 110. A separate audio recorder/player device (not shown) may be used instead of audio input 180, if desired, for recording and playing back spoken parts of the diagnostic procedure as outlined above.

Referring now to FIG. 5, another embodiment of a diagnostic method uses an internet-based system 200. The learner uses workstation 202 which includes a processor 210, with memory 240, and coupled to CRM 220. Processor 210 has inputs 250 for the learner's input device (e.g., keyboard), audio input, and, preferably also a visual input. The learner's workstation 202 may also include a printer 270, or other suitable output for a diagnostic report. The processor 210 is configured for connecting to a network interface 290, such as the internet or other network, as does the educator's server 300 which is located at a site that is remote from the learner. The educator's server preferably includes a processor, inputs and output devices similar to those of the learner, and further including the programming, memory and databases necessary to download information and instructions for conducting the steps of the diagnostic method. Preferably the educator and the learner are able to see and hear each other and exchange data via the network interface (internet connection) and local devices (e.g., teleconferencing, internet web-based conferences). In a variation of this arrangement, the visual inputs could be omitted if desired and the audio input portion of the method may be conducted via telephone conference in conjunction with the visual display of the exam questions and answers, and other information, and other input devices (e.g., keyboard), as necessary.

In still another variation of the embodiment depicted in FIG. 5, the network interface 290 is configured as a local network connection instead of an internet connection to provide for remote communication between the educator's server and the learner.

Figure 6:
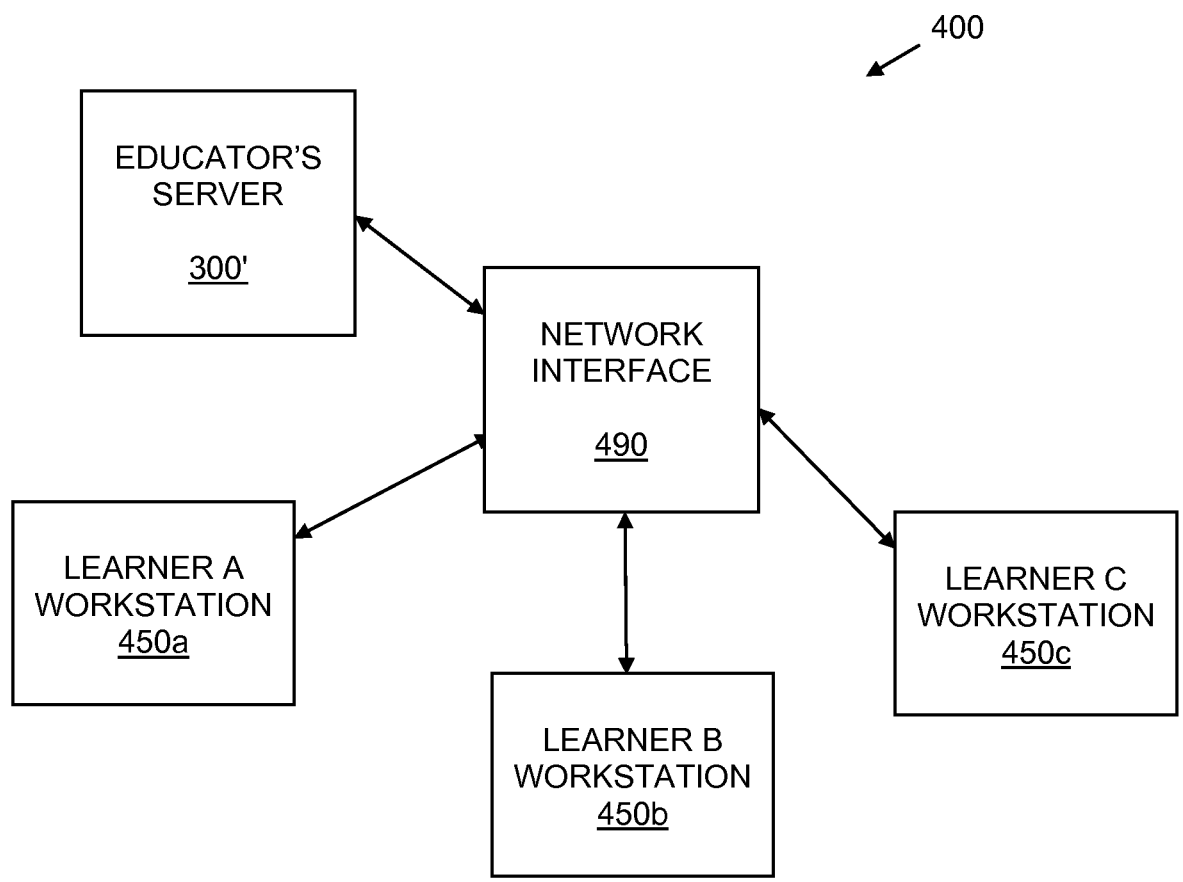
FIG. 6 is a schematic diagram illustrating an arrangement of a diagnostic system configured for performing multiple diagnostic procedures on different learners, in accordance with certain embodiments of the invention.

In FIG. 6, a network-based system 400 is employed in certain embodiments in order to carry out a diagnostic procedure with a small group of learners in a single interactive session via a network connection. It should also be appreciated that this multi-learner diagnostic method may also be conducted via an internet connection (e.g., teleconference) instead of a network. This example of an educator administered diagnostic method is carried out with three learners, A, B and C, each of whom has a system 450a, 450b, 450c that includes a processor, input device (e.g., keyboard), visual display, audio input, and outputs similar to those shown in FIG. 4. The educator causes the same or different exam questions to be displayed to each of the learners, and then the corresponding answers are displayed. Audio and/or written instructions are communicated by the educator to each of the learners. Each of the learner's spoken and typed responses are input into and recorded by the educator's server. The diagnostic method steps are carried out in a manner similar to those described in the foregoing examples. At the end of the session, each learner receives a printed diagnostic report describing his/her particular test-taking error patterns. Preferably the educator also discusses the report with the learner via the audio/visual connection.

It is also preferred that each learner also receives specific recommendations of remedial actions that he/she can take to improve test taking performance. Some examples of such remedial actions are listed in Table 3.

In a variation of the diagnostic configuration shown in FIG. 6, in some instances a group of learners may wish to help each other with learner-administered diagnostics, without the initial services of an educator. In this type of application, the learners obtain all the necessary programming and instructions for conducting the method on CDs or DVDs, or by internet download from an educator's server or authorized software provider. Model exam questions and possible answers may be included in the software, or the learners may input their own exam questions from a recent exam on which the learner missed some questions (i.e., arrived at a wrong answer). The learners may be in the same room, or they may be in audio/visual communication by local network or via internet connection. Each learner, in turn, reads the questions and answers and verbally "walks through" out loud the questions and answers as described above. While the first learner is acting as the subject being diagnosed, the other learners are listening and noting errors (manually or by keying them into a processor), using, for example, an error identification/assessment tool such as that illustrated in FIG. 3. After each subject has read and discussed aloud the desired number of exam questions and answers, the other learners enter the error data into the computer program, review the data which has been collected and stored in the processor memory, and assess the subject's results for test-taking error patterns, to reach a diagnosis. Individual diagnostic reports may be produced, and appropriate remedial actions may be printed out for each subject.

In still other embodiments, school or university educators, individual teachers or tutors, and students and their families are able to obtain all the necessary programming and instructions for conducting the method on CDs or DVDs, or by download from an authorized software provider. Alternatively, they may interact directly with a remote server via network or internet connection to conduct diagnostic procedures as described herein. Model exam questions and possible answers may be included in the software, or the users may input their own exam questions based on their own curriculum, for example.

Post-DiagnosticRemedial Actions

Once the assessment and diagnosis are made in accordance with any of the above-described diagnostic method embodiments, and a diagnostic summary report is obtained showing how the learner tends to arrive at wrong answers, the educator may recommend appropriate educational and psychological prescriptions for correcting the test taking patterns which lead the learner to the wrong answers. Although the prescriptives shown in Table 3 are themselves well known in the educational field, they have not been used before in conjunction with the present diagnostic methods.

TABLE 3

| | Remedial Prescriptives |
|---|---|
| Diagnosis | Remedial Action |
| 1. Lack of knowledge | The learner are taught speed reading, new and better ways to study, be referred to find out what his/her learning style is, e.g., visual, verbal, psychomotor, tactile, etc. |
| 2. Lack of comprehension | Learner are taught the elements of translation, interpretation and extrapolation and how to recognize them in course material and subsequently how to apply the within an exam question. |

TABLE 3-continued

Remedial Prescriptives

| Diagnosis | Remedial Action |
|---|---|
| 3. Errors in applying knowledge | Errors in applying knowledge are potentially corrected by learner learning how to recognize principles or generalizations, problem solving. |
| 4. Inability to analyze | Inability to analyze is potentially remedied by learning how to break down information into elements, relationships, and organizational principles. |
| 5. An inability to synthesize | An inability to synthesize can be remedied by teaching effective communications, how to develop a plan of operation and produce a set of abstract relations. |
| 6. Linguistic errors | When the translator/learner is still thinking in a first language, and that is apparent on the English (ESL) written test question, the learner must go back to learn the language he/she is being educated in. The specific diagnostics such as verb tense, placement of question elements, and prepositional phrases are identified in the assessment. |
| 7. Logistics | Once a number of the above-mentioned mistakes are revealed, the remedy is generally made more simple. The learner may not know that he/she is doing the erroneous thing until it becomes apparent when a question or answer is read out loud to a neutral observer. One exception to that, however, is a common mistake learners make when taking a test: they narrow multiple choice options down to two possible answers, and then have difficulty deciding which is the right answer. The best solution for that is to point the learner back to the stem of the question itself to look for clues which point to the correct answer. |

Screening for Learning Disabilities

In addition to the above diagnostic processes, a method disclosed herein may additionally serve as a screening test for various learning disabilities. When none of the logistic, cognitive, affective or linguistic diagnoses are detected during a diagnostic procedure, or none of the errors that are identified provide a satisfactory picture of the learner's test-taking pattern, the student is preferably referred for further testing for a learning disability.

Without further elaboration, it is believed that one skilled in the art can, using the description herein, utilize the present invention to its fullest extent. The embodiments described herein are to be construed as illustrative and not as constraining the remainder of the disclosure in any way whatsoever. While the preferred embodiments of the invention have been shown and described, many variations and modifications thereof can be made by one skilled in the art without departing from the spirit and teachings of the invention. Accordingly, the scope of protection is not limited by the description set out above, but is only limited by the claims, including all equivalents of the subject matter of the claims. The disclosures of all patents, patent applications and publications cited herein are hereby incorporated herein by reference, to the extent that they provide procedural or other details consistent with and supplementary to those set forth herein.

The invention claimed is:

1. A computer program product comprising a non-transitory computer readable medium having a memory for storing data for access by a computer program, the memory comprising:
    a data structure, the data structure including information used by a processor;
    a plurality of data fields stored in the memory, each of the data fields containing different information from the database;
    an exam question data field, wherein an exam question is stored in the exam question field in a data structure in the database;
    a possible answer field in the data structure in the database in the computer readable medium, wherein the possible answer field contains at least one possible answer to an exam question, and wherein the at least one possible answer is retrieved from an answer field in the data structure in the database;
    an error data field in the data structure for storing the any logistic, cognitive, affective and linguistic errors made by a learner while reading answers and explaining rationales for answers; and
    instructions that, when executed by a processor, cause the processor to:
    read the exam question from the data structure;
    convert the exam question into a digital representation, wherein the exam question digital representation is stored in a digital exam question field in the data structure in the data base;
    send the digital representation of the exam question over the internet to a visual display at a location for the learner;
    display the exam question and receive, from an audio input device, a digital representation of the exam question from the learner reading said question aloud on the audio input device;
    receive over the internet from the audio input device, data input on a digital audio input device from the learner reading the question aloud;
    receive data input on the digital audio input device from the learner explaining aloud in his/her own words what said exam question is asking;
    analyze the data input from the digital audio input device from the learner explaining aloud in his/her own words what said question is asking, for any logistic, cognitive, affective and linguistic errors made by the learner in said reading of the questions and answers in said explaining of the question and possible answers, wherein said analyzing for any logistic errors comprises identifying one or more problems by comparing the digital audio of the learner's explanation of what the question is asking to the exam question;

wherein identifying one or more problems comprises determining if the learner is reading too much into the question, choosing a distracter question, losing train of thought, misreading the question, reading more into the question than the question asks, thinking tangentially, using preconceived ideas that are not actually in the question and does not understand what the question was asking, and wherein said analyzing of any cognitive errors comprises comparing an answer from the learner to the exam question from the learner and identifying by the processor, one or more of the following problems from the comparing of the answer from the learner to the exam question: learner lack of knowledge, learner lack of comprehension comprising inability to translate, does not know how to interpret, does not know how to extrapolate, learner inability to apply knowledge comprising learner inability to recognize principles and generalization and learner inability to problem solve and learner inability to analyze components comprising learner inability to break down information into component parts and elements, learner does not recognize relationships between components and learner does not perceive organizational components and learner inability to synthesize comprising learner inability to develop a plan of operation and learner inability to recognize a set of abstract relations;

wherein the instructions further cause the processor to:

convert the at least one possible answer to the exam question into a digital representation of the at least one possible exam question and send the digital representation of the at least one possible exam question to a visual display for presenting to said learner on said visual display the digital representation of the at least one possible answer to said question;

receive digital audio data input from the digital audio input device from the learner, wherein the learner reads aloud each said possible answer into the digital audio input device, and explains his/her rationale for selecting a particular answer to the question into the digital audio input device;

analyze any logistic, cognitive, affective and linguistic errors made by the learner in said reading of each said answer or in said explaining of his/her rationale;

identify one or more of the following problems: not aware of or willing to receive value, not willing to respond satisfactorily, does not accept preferred value or commit to same, does not conceptualize and organize values, and unable to identify or characterize a value or value complex; and wherein said analyzing of linguistic errors comprises identifying one or more of the following problems: literal translation from first language which changes the meaning of the question and out of sequence question components comprising subject, verb, direct object, pronouns and nouns;

store data in the error data field in the data structure in the data base representing the learner's errors in the database in the computer readable medium;

assess error patterns;

obtain a digital representation of a diagnostic report indicating how the learner tends to select incorrect answers to exam questions, wherein the diagnostic report comprises data indicating how the learner tends to select incorrect answers to exam questions;

send the digital representation of the diagnostic report to a digital display and audio presentation device for presentation to the learner; and store cognitive, affective and linguistic errors made by the learner in said reading of the questions and answers or in said explaining of the question and possible answers.

2. The computer program product of claim 1, further comprising:

an education prescriptive field in the data structure storing an education prescriptive for said learner based on said diagnostic report, wherein the instructions further cause the processor to:

determine an education prescriptive based on cognitive, affective and linguistic errors made by the learner in said reading of the questions and answers or in said explaining of the question and possible answers;

generate a digital representation of the education prescriptive; and send the digital representation of the education prescriptive to the display and audio presentation device for presentation to the learner.

3. The computer program product of claim 2, further comprising:

a test-taking error pattern report field in the data structure, wherein the instructions further cause the processor to:

analyze test-taking error patterns of multiple learners, provide a set of diagnostic data comprising logistic, cognitive, affective and linguistic test taking errors of a learner, provide a set of demographic data relating to said learner, store said diagnostic and demographic data of said learner in the database, store corresponding sets of diagnostic and demographic data obtained from a plurality of other learners in said database, and obtain a test-taking error pattern report.

* * * * *